Aug. 19, 1941.   W. G. WEHR   2,253,256
MONORAIL TRACTOR
Filed June 14, 1940   2 Sheets-Sheet 2

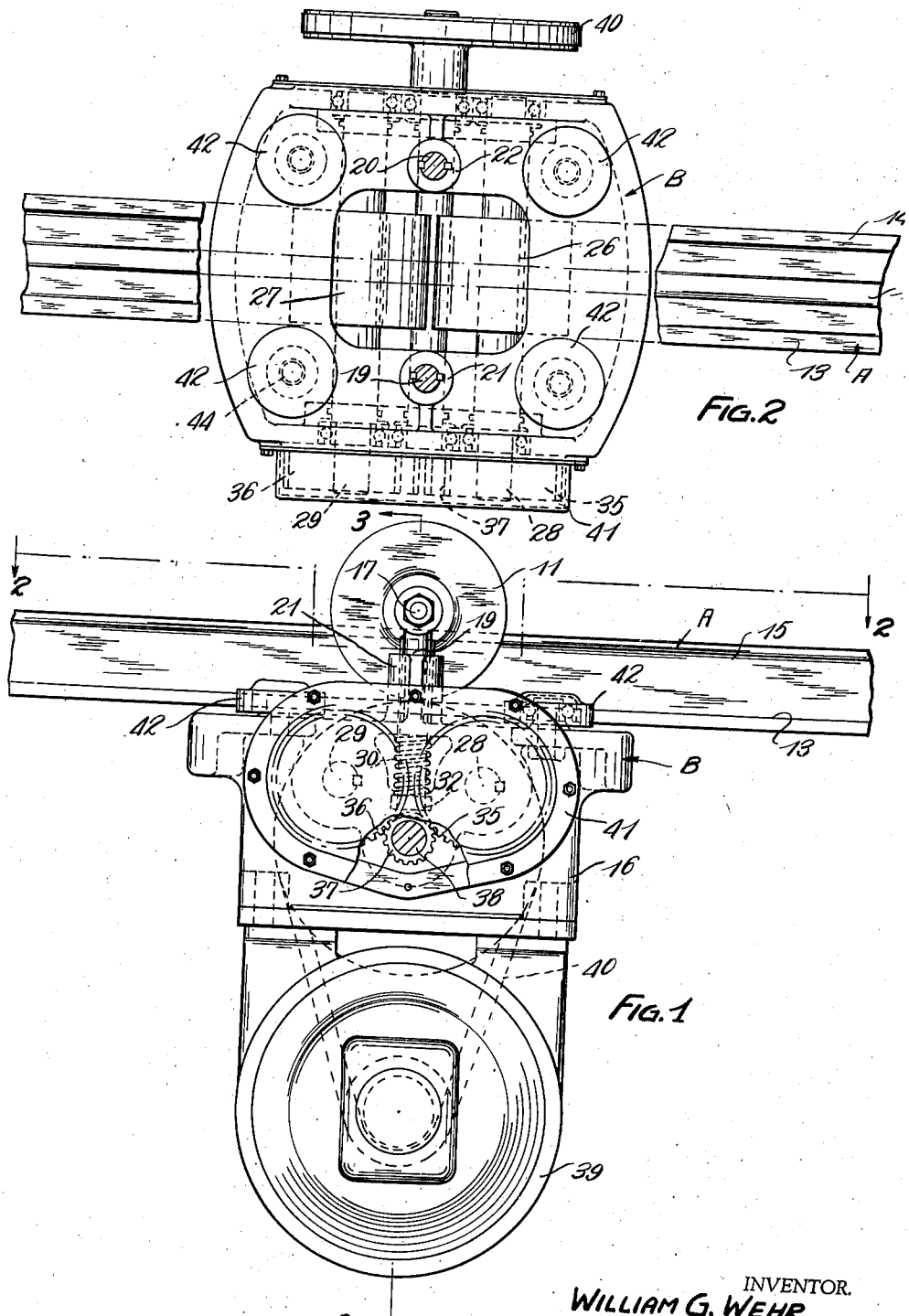

INVENTOR.
WILLIAM G. WEHR
BY Kwis Hudson & Kent
ATTORNEYS

Patented Aug. 19, 1941

2,253,256

UNITED STATES PATENT OFFICE 2,253,256

MONORAIL TRACTOR

William G. Wehr, East Cleveland, Ohio, assignor to The Cleveland Crane & Engineering Company, Wickliffe, Ohio, a corporation of Ohio Application June 14, 1940, Serial No. 340,512

4 Claims. (Cl. 105—154)

The present invention relates to overhead monorail carrier systems and more particularly to tractors for use with electrified overhead monorail carrier systems, and has for its principal object the provision of a novel tractor adapted to operate on an electrified overhead monorail system and push or pull one or a plurality of load supporting carriers thereabout, which tractor will be small and simple in construction, inexpensive to manufacture, comprise a minimum number of parts, and be reliable in operation.

The present invention resides in certain details of construction and combinations and arrangements of parts and further objects and advantages thereof will be apparent to those skilled in the art to which the invention relates from the following description of the preferred embodiment thereof described with reference to the accompanying drawings forming a part of this specification in which similar reference characters designate corresponding parts throughout the various views and in which:

Fig. 1 is a side elevational view with portions broken away of a tractor embodying the present invention;

Fig. 2 is a plan view approximately on the line 2—2 of Fig. 1; and

Figure 3:
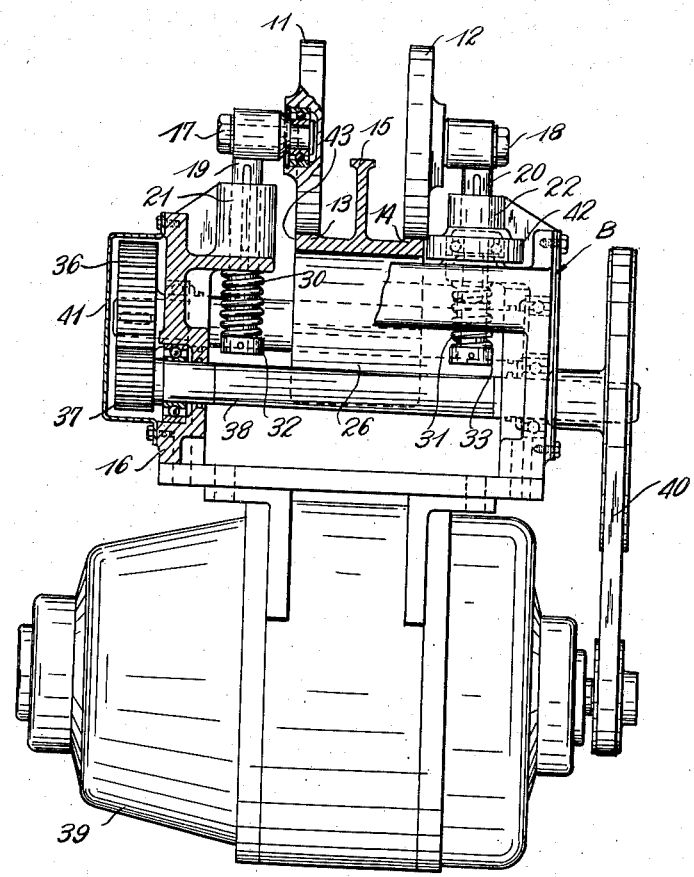
Fig. 3 is a section taken on line 3—3 of Fig. 1 with portions in elevation.

Referring to the drawings, the reference character A designates an overhead monorail track or rail of inverted T-shaped cross section upon which a tractor B embodying the present invention is movably supported by a pair of flangeless wheels 11 and 12 which engage tread portions 13 and 14, see Fig. 3, of the rail A. The thread portions of the rail are located at opposite sides of the vertical flange 15 through the medium of which the rail is suspended from an overhead support in a manner well understood in the art. The supporting wheels 11 and 12 are located at or adjacent to the vertical transverse mid-plane of the tractor and are supported for vertical movement relative to the frame 16 of the tractor. As shown the supporting wheels are rotatably connected through anti-friction bearings to stud shafts 17 and 18, which stud shafts are in turn secured in the upper ends of members 19 and 20 non-rotatably but slidably supported for vertical movement in suitable bosses 21 and 22 formed integral with the frame 16 of the tractor.

The tractor is propelled along the monorail A by a pair of rollers 26 and 27 fixed to shafts 28 and 29, respectively, which shafts are rotatably supported in the frame 16 preferably by anti-friction bearings. The rollers 26 and 27 engage the underside of the rail A. As shown, these rollers are substantially as long as the rail is wide and are preferably made of hard rubber or some similar material which has a high coefficient of friction. The rollers 26 and 27 are adapted to be held in firm but yieldable contact with the underside of the rail A by a plurality of compression springs 30 and 31 surrounding the members 19 and 20 and interposed between the undersides of the bosses 21 and 22 and members 32 and 33 fixed to the lower ends of the members 19 and 20. The shafts 28 and 29 are driven through gears 35 and 36 fixed to the left-hand ends thereof, as viewed in Fig. 3, which gears are continuously in mesh with a pinion 37 fixed to a shaft 38 rotatably supported by anti-friction bearings in the frame 16 underneath the shafts 28 and 29 and midway between the same. The shaft 38 is adapted to be driven in either direction by a reversible electric motor 39 suspended underneath the frame 16 and operatively connected thereto by a V-belt drive, designated generally by the reference character 40. The gears 35 and 36 and the pinion 37 are preferably enclosed in a gear case 41 which is partly filled with a suitable lubricant during operation.

In plan the frame of the tractor B appears more or less square and has a relatively small guide roller 42 located adjacent each corner, two on each side of the rail A, which rollers engage the vertical side edges 43 of the rail and maintain the tractor in proper alignment therewith as the tractor travels along the rail. As shown, the rollers 42 are carried by short vertical shafts 44 fixed in the frame 16.

The fact that the driving wheels 26 and 27 of the tractor are substantially as long as the rail is wide gives a large area of contact, thus reducing slippage and the fact that the points of contact between both the supporting and the driving wheels of the tractor and the rail are relatively close together, allows the tractor to negotiate relatively sharp bends in the overhead track. The use of flangeless supporting wheels in combination with guide rollers or wheels in a monorail tractor produces an unexpected improved result and eliminates the severe binding effect produced when flanged wheel tractors pull a number of loaded carriers around a corner.

The system is electrified and current is supplied to the motor 27 by a current collector carried by the tractor and which travels along a trolley supported adjacent to the rail either by the rail or the supporting structure therefor. This mechanism is not shown in the drawings and will not be herein described in further detail as it is well known in the art.

From the foregoing description of the preferred embodiment of the invention, it will be apparent that the objects of the invention heretofore enumerated have been attained and a novel tractor adapted to operate on an electrified overhead monorail system has been provided which tractor is small and simple in construction, inexpensive to manufacture, and reliable in operation and which comprises a minimum number of parts. While the preferred embodiment of the invention has been described in considerable detail, I do not wish to be limited to the particular construction shown which may be varied within the scope of this invention and it is my intention to cover hereby all adaptations, modifications and uses thereof that come within the practice of those skilled in the art to which the invention relates.

Having thus described my invention what I claim is:

1. A tractor for overhead monorail carrier systems comprising a frame generally rectangular in plan, a pair of flangeless supporting wheels adapted to engage and travel along opposite flanges of an inverted T-shaped overhead monorail, means for movably connecting said wheels with said frame adjacent to the center vertical transverse plane of the tractor for vertical relative movement therebetween, resilient means for yieldably urging said frame upwardly relative to said wheels, a traction wheel rotatably supported in said frame and adapted to engage the bottom of the rail upon which the tractor is supported, and a plurality of guide wheels operatively connected to said frame and adapted to engage opposite sides of the rail upon which the tractor is supported, one of said guide wheels being located adjacent to each of the corners of said frame.

2. A tractor for overhead monorail carrier systems comprising a frame generally rectangular in plan, a pair of flangeless supporting wheels adapted to engage and travel along opposite flanges of an inverted T-shaped overhead monorail, means for slidably connecting said wheels with said frame adjacent to the center vertical transverse plane of the tractor for vertical relative movement therebetween, resilient means for yieldably urging said frame upwardly relative to said wheel, a pair of traction wheels rotatably supported in said frame at opposite sides of said supporting wheels and adapted to engage the bottom of the rail upon which the tractor is supported, and a plurality of guide wheels operatively connected to said frame and adapted to engage opposite sides of the rail upon which the tractor is supported, one of said guide wheels being located adjacent to each of the corners of said frame.

3. A tractor for overhead monorail carrier systems comprising a frame generally rectangular in plan, a pair of flangeless supporting wheels adapted to engage and travel along opposite flanges of an inverted T-shaped overhead monorail, means for movably connecting said wheels with said frame adjacent to the center vertical transverse plane of the tractor for vertical relative movement therebetween, resilient means for yieldably urging said frame upwardly relative to said wheels, a traction wheel rotatably supported in said frame and adapted to engage the bottom of the rail upon which the tractor is supported, an electric motor suspended underneath said frame, means for operatively connecting said motor to said traction wheel, and a plurality of guide wheels operatively connected to said frame and adapted to engage opposite sides of the rail upon which the tractor is supported, one of said guide wheels being located adjacent to each of the corners of said frame.

4. A tractor for overhead monorail carrier systems comprising a frame generally rectangular in plan, a pair of flangeless supporting wheels adapted to engage and travel along opposite flanges of an inverted T-shaped overhead monorail, means for slidably connecting said wheels with said frame adjacent to the center vertical transverse plane of the tractor for vertical relative movement therebetween, resilient means for yieldably urging said frame upwardly relative to said wheel, a pair of traction wheels rotatably supported in said frame at opposite sides of said supporting wheels and adapted to engage the bottom of the rail upon which the tractor is supported, an electric motor suspended underneath said frame, and means for operatively connecting said motor to said tractor wheels and a plurality of guide wheels operatively connected to said frame and adapted to engage opposite sides of the rail upon which the tractor is supported, one of said guide wheels being located adjacent to each of the corners of said frame.

WILLIAM G. WEHR.